(12) United States Patent
Henrion

(10) Patent No.: US 6,813,265 B1
(45) Date of Patent: Nov. 2, 2004

(54) METHOD AND SYSTEM FOR CONTROLLING THE ORDER OF DEPARTURE OF TEMPORARILY STORED INFORMATION OR OBJECTS

(75) Inventor: Michel Henrion, Brussels (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/535,164

(22) Filed: Mar. 24, 2000

(30) Foreign Application Priority Data

May 10, 1999 (FR) .............................. 99 05927

(51) Int. Cl.[7] .............................. H04L 12/50
(52) U.S. Cl. .............................. 370/378; 370/381
(58) Field of Search ................ 370/378, 360, 370/363, 371, 374, 375, 379, 381, 382, 383, 395.7, 395.71, 395.72; 711/214, 215, 216

(56) References Cited

U.S. PATENT DOCUMENTS

| | | | | |
|---|---|---|---|---|
| 4,005,391 A | | 1/1977 | MacPherson | |
| 4,271,467 A | * | 6/1981 | Holtey | 711/151 |
| 4,345,316 A | * | 8/1982 | Hirotani et al. | 377/64 |
| 4,766,533 A | * | 8/1988 | Lahmeyer | 712/248 |
| 4,814,974 A | * | 3/1989 | Narayanan et al. | 710/244 |
| 5,303,382 A | | 4/1994 | Buch et al. | |
| 5,377,339 A | * | 12/1994 | Saito et al. | 712/215 |
| 5,452,428 A | * | 9/1995 | Nagata et al. | 712/211 |
| 5,613,069 A | * | 3/1997 | Walker | 709/238 |
| 6,674,753 B1 | * | 1/2004 | Harasaki et al. | 370/378 |

* cited by examiner

*Primary Examiner*—Douglas Olms
*Assistant Examiner*—Ricardo M. Pizarro
(74) *Attorney, Agent, or Firm*—Sughrue Mion, PLLC

(57) ABSTRACT

A system for determining an order of service of temporarily stored objects, at least one priority flag being attached to certain objects, includes a set of storage units disposed in a matrix organized into C subsets of elements, where C is the number of objects stored temporarily. Each subset corresponds to an object and all the subsets include the same number P of elements corresponding to P time positions. Each element includes a memory which can receive at least one time priority flag. A first time position selector determines, within the matrix, and from all the subsets, the element(s) marked by a particular time priority flag and corresponding to the time position having the lowest value.

18 Claims, 8 Drawing Sheets

METHOD AND SYSTEM FOR CONTROLLING THE ORDER OF DEPARTURE OF TEMPORARILY STORED INFORMATION OR OBJECTS

BACKGROUND OF THE INVENTION

1. Field of the Invention

The invention relates to a system for and a method of determining the order of departure (or of service) of temporarily stored information or objects.

It relates in particular to the evacuation of a flow of information or objects arriving at a particular location where they are stored temporarily and from which they must be evacuated in an order that depends on various criteria.

Such evacuation or "service" gives rise to difficult problems, in particular if the incoming bit rate and the evacuation bit rate are high.

These problems arise more particularly in telecommunication networks in which digital information signals are transmitted in the form of cells or packets and are stored temporarily in buffers. The cells or packets support calls with different grades of service and it is therefore standard practice to allocate them different bit rates and different relative priorities of service. To control the output of packets or cells from the buffer according to their relative priority, the order of service (or evacuation) of the packets or cells in the buffer must therefore be determined continuously.

Similar problems of establishing an order of distribution can also arise in other technical fields, for example aircraft arriving at and departing from an airport or trains arriving at and departing from a train station.

Generally speaking, buffer service disciplines are classified into two categories according to the time at which the order of service is determined, namely:

first-in-first-out (FIFO) queues, in which the order of service is determined when the packets or cells arrive at the buffer, and schedulers, in which the order of service is determined when the packets or cells depart from the buffer.

2. Description of the Prior Art

U.S. Pat. No. 4,005,391 describes a system for determining the interrupt priority order of a processor which several peripheral devices can access, but not simultaneously. The values of the interrupt request signals to be processed are stored in an input-output device. The priority information is stored in the elements of a memory: the position of a bit at 1 in a series of bits at 0 determines the service priority for a peripheral device. The address counter scans the content of the buffer to transcode, as it were, the regularly incremented value supplied by the counter. The buffer has eight outputs, only one of which supplies the value 1, the content of the memory being chosen so that all the peripheral devices have different priority levels. Each output of the memory supplies the value 1 in succession to enable AND gates in succession.

An AND gate enabled at one input transmits any interrupt request that it receives on its other input. Scanning is stopped as soon as an AND gate has transmitted an active interrupt request signal. This scanning enables the interrupt requests to be considered in succession and in a particular priority order by enabling gates in succession, but there is no provision for defining the priorities dynamically.

The present invention relates to a scheduler which continuously takes account of the respective relative priorities of the various packets or cells stored in the buffer of an ATM switch, for example.

The order of service is determined in a scheduler of this kind by a selection algorithm taking account of time parameters associated with the packets or cells stored in the buffer. Until now these time parameters have been managed using either random access memory organized in the form of tables or chained lists or content-addressable memory. The processing times of such systems can be incompatible with operation at high bit rates, when the time allocated to each service is very short.

The invention provides a system which can schedule dynamically and very fast.

For simplicity, in the following description, the term "object" is sometimes used to refer to information or an object processed in the system.

SUMMARY OF THE INVENTION

The invention provides a system for determining an order of service of temporarily stored objects, at least one priority flag being attached to certain objects, the system including:

a set of storage units disposed in a matrix organized into C subsets of elements, where C is the number of objects stored temporarily, each of said subsets corresponding to an object and all the subsets including the same number P of elements corresponding to P time positions, each element including a memory which can receive at least one time priority flag, and first time position selector means for determining, within the matrix, and from all the subsets, the element(s) marked by a particular time priority flag and corresponding to the time position having the lowest value, and means for writing a time priority flag for a given object into a random access memory element corresponding to a time position allocated to that object.

The priority flags can therefore be written dynamically into a matrix of storage elements, each row corresponding to a subset, for example, i.e. to an object, and each column to a particular time position. The highest priority is assigned to the row(s) with an element containing a priority flag whose flag is at the lowest rank.

In one embodiment, object priority selector means are provided for selecting, in the matrix, only one of the subsets preselected by the first time position selector means. Alternatively, a predetermined number of objects to be serviced simultaneously is selected from the objects that have been preselected.

In these embodiments, the system includes object priority selector means for selecting at least one of the subsets preselected by the first time position selector means.

In one embodiment, to allow for the advancing clock time, at each clock time an offset of one time position is introduced between the time priority flags of each subset and the rank corresponding to their time position so that their new rank corresponds to the next lower time position.

The offset by one time position is effected at the end of each object service time if the service is periodic at each clock time. This time position shift is effected, for example, by transferring the content of the memory of each element to the next element corresponding to the next lower time position.

Alternatively, the contents of the memories of the elements are not modified but instead their ranks are shifted, each rank of an element being reduced by one unit.

In one embodiment, the object priority selector means are connected to the memory elements by means of one incoming conductor per subset transmitting a selected object signal and effect the final choice of at least one object to be serviced from the objects corresponding to the subsets transmitting a selected object signal.

In one embodiment, the first time position selector means are connected to the memory elements by two common conductors for each of the P time positions, namely an incoming common conductor for receiving a time position signal that is a candidate for selection, and an outgoing common conductor for transmitting a retained time position signal. In this case, the first time position selector means identify, among the P signals received on the incoming common conductors, the first time position signal which is a candidate for selection corresponding to the time position having the smallest value and indicate the selected first time position by transmitting a retained time position signal on the outgoing common conductor corresponding to the selected first time position.

In one embodiment, for each subset, the time position of the element containing a time priority flag represents the required time of servicing the object corresponding to that subset relative to the other objects, the first time position selector means giving priority to selecting the object(s) whose priority flag is in an element corresponding to the time position with the lowest value.

In one embodiment, each memory element:
- activates the corresponding incoming common conductor of the first time position selector means to transmit thereto a time position signal which is a candidate for selection if the time priority flag is marked in its memory,
- receives from the first time position selector means, over an outgoing common conductor for each time position, a retained time position signal if the first time position selector means indicate that the time position of that element has been selected, and
- generates, on one common conductor per subset, a selected object signal addressed to the priority object selector means, if, simultaneously:
- the time priority flag is marked in its memory, and
- the retained time position signal is received from the outgoing common conductor of the first time position selector means.

In one embodiment, a time priority flag for each subset represents the required latest time for servicing the object.

In one embodiment, one or both of the following two additional priority flags is or are added to each subset:
- a flag of the earliest authorized selection time position before which the object cannot be serviced, the flag having a time position of smaller value than that of the flag representing the latest required time for service, and
- a flag of the optimum selection time position for service, the time position of the flag having a value less than that of the flag of the lost required time for service, and, if these two additional priority flags are present simultaneously, the optimum selection time position flag has a value which is greater than that of the earliest authorized selection flag before which the object cannot be serviced.

If the additional two priority flags are present simultaneously, the optimum selection time position flag has a value higher than that of the earliest authorized selection flag before which the object cannot be serviced.

In one embodiment, a plurality of different type time priority flags is attached to each subset and the system includes a number of flag element matrices equal to the number of types of flag.

In one embodiment, a plurality of flags of different types is allocated to each subset, each element includes a number of memory points at least equal to the number of types of flag and each memory point is allocated to a flag of a particular type.

In one embodiment, the system includes flag search means which, during a first phase, search each subset for the first time priority flag which, of all the flags of the subset, has the time position of the highest value, and after preselecting the subsets which have the first time position flag of the lowest value, during a second phase, the subsequent flags of lower time position in the preselected subsets are searched for and the subsets are selected which have a subsequent flag at the lowest time position.

In one embodiment:
- each element stores a single priority flag,
- a lost time flag, an earliest authorized selection flag and an optimum time flag are allocated to each subset, the flags corresponding in each subset to different time positions,
- the object priority selector means include additional means for generating a time priority flag search signal for each of the subsets whose earliest authorized selection flag has reached the object priority selector means on going beyond the lowest time position to reach the time position of the server, and
- the first time position selector means include additional means for effecting two successive phases of selection of other priority flags, first by preselecting the object(s) whose time position of the latest time flag has the lowest value, and then by selecting, from the preselected subsets, the object(s) whose time position of the optimum time flag has the lowest value.

In one embodiment, the object priority selector means further include, for each subset, a memory in which are stored:
- an authorized selection indication as soon as the time position of the authorized selection priority flag has reached the time position of the server, and
- an optimum position reached indication as soon as the time position of the optimum position priority flag has reached the time position of the server.

In one embodiment, the object priority selector means are connected to each subset of the matrix of elements by:
- an outgoing conductor connected to the element of the subset that corresponds to the time position having the highest value, enabling it to generate, for the corresponding subset, a flag search activation signal for initiating an operation searching for a first flag to be selected as a matter of priority in the subset, and
- an incoming conductor from the element of the subset that corresponds to the time position having the lowest value, enabling it to receive a selected object signal and to effect the final choice of at least one object to be serviced from the subsets from which it receives a selected object signal.

In one embodiment, each storage element is connected:
- to the element of the same subset corresponding to the next higher time position, via a flag search input for receiving a flag search signal, the element of the subset having the time position with the highest value receiving a flag search signal supplied by the object priority selector means, and
- to the memory element of the same subset corresponding to the next lower time position, via a flag search output for transmitting a flag search signal, the element having the lowest time position value supplying the flag search signal to the object priority selector means, which signal, if it is active, signifies a selected object signal for those means.

In addition, in this embodiment each memory element:

activates the corresponding incoming common conductor of the time selector means to transmit thereto a time position signal which is a candidate for selection if, simultaneously, an active flag search signal is received and the time priority flag is marked in the memory of the element, activates an unselected local priority flag signal if, simultaneously:

an active flag search signal is received, a time priority flag is marked in its memory, and no retained time position signal is received from the outgoing common conductor of the time selection means, and retransmits to the element of the same subset which has the next lower time position a flag search signal which is active if, simultaneously:

an active flag search signal is received, and either the element has no time priority flag marked in its memory, or the element has a time priority flag marked in its memory and the unselected local priority flag signal is not active, the effect of the unselected local priority flag signal then being to block the propagation of the flag search signal to the other elements of the subset of lower rank if the element has transmitted a time position signal which is a candidate for selection to the time selector means but the means have not returned a retained time position signal.

The invention also relates to application of the above system to managing cells or packets of digital signals in a telecommunication system buffer which cells or packets enter and leave at a high frequency.

Other features and advantages of the invention will become apparent in the course of the following description of some embodiments of the invention, which is given with reference to the accompanying drawings.

DETAILED DESCRIPTION OF THE PREFERRED EMBODIMENTS

Figure 1:
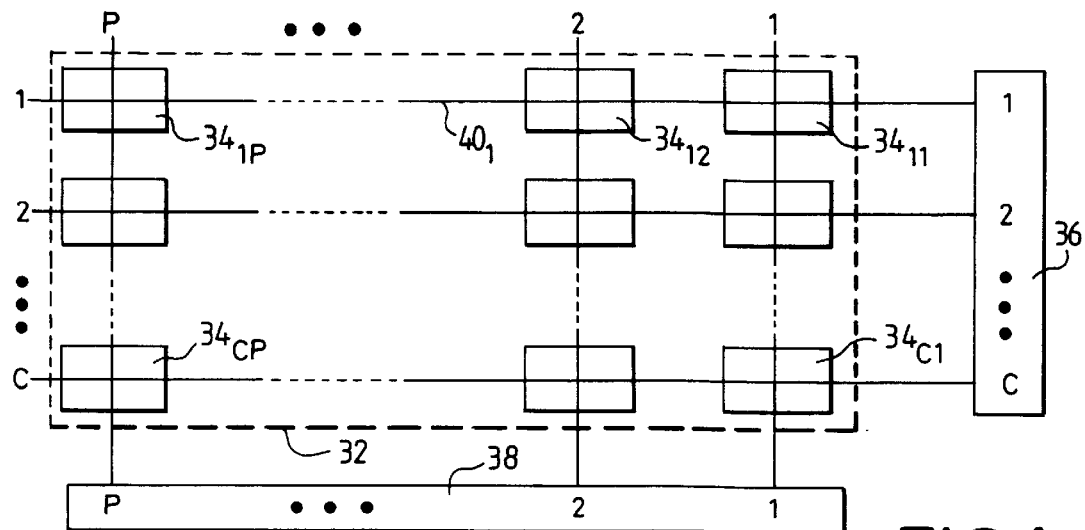
FIG. 1 is a diagram of a control system according to the invention.

The embodiment of the invention now to be described with reference to the figures relates to a telecommunication system in which digital signals are transported by cells or packets. Hereinafter, only the term "cell" is used.

The cells pass through buffers at switching nodes of a network. When they are stored in a buffer (not shown) they must leave it in an order, or sequence, that can depend on the nature of the call, for example, in particular its bit rate and its grade of service. This means that in some circumstances it is necessary to take account of the relative priorities of the cells to be serviced in the buffer.

It is therefore necessary to determine the order in which the cells must be evacuated from the buffer memory and to assure that such evacuation or service is performed at the appropriate time, allowing for the fact that cells are constantly entering and leaving the buffer at a high frequency.

The order of service of the cells must additionally be determined within a time that is compatible with the bit rate and the delay required for each call.

To achieve the above objectives, a control system 30 (FIG. 1) is associated with a buffer. The system includes memories containing indications of the time priorities of the cells and can at all times supply the buffer with a control signal telling it which cell(s) must be serviced.

The system 30 includes a matrix 32 of C×P elements $34_{11}$, $34_{12}, \ldots, 34_{CP}$. Each element has at least one memory point for marking a priority flag. The elements are disposed in C rows numbered 1 through C and P columns numbered 1 through P.

Each row corresponds to a cell in the buffer, which therefore contains C cells. To each cell there correspond P time positions (columns). In one example, there are 128 rows (cells) and 256 columns (time positions).

Note that the number of time positions is generally not related to the number of cells. In a scheduler, the number of time positions depends only on the time interval during which the cells have to be scheduled.

The time positions are represented by indices increasing from 1 to P from right to left, the index, or rank, 1 corresponding to the time nearest the service.

The C rows are associated with a row selector 36 corresponding to cells to be serviced by the system. At service times, such as a clock time (if the service is periodic), the selector determines which cell(s) must be serviced, allowing for a first time selection previously effected by means of a time position selector 38 associated with the various columns.

A first type of time priority flag associated with each element $32_{ij}$ represents, for the cell concerned, the lost departure time LDT by which the cell must be serviced. Its time position is determined by a buffer management unit external to the system 30. This last time position LDT, which is in the range from 1 to P, is a function in this example of the arrival time of the cell concerned in the buffer and parameters relating to the type (or class) of cells to which it belongs, these parameters leading to a greater or lesser permissible delay for each cell. In each row of the matrix 32 there is only one flag LDT.

The selectors 38 and 36 control selection on the basis of these flags, as explained hereinafter.

Figure 2:
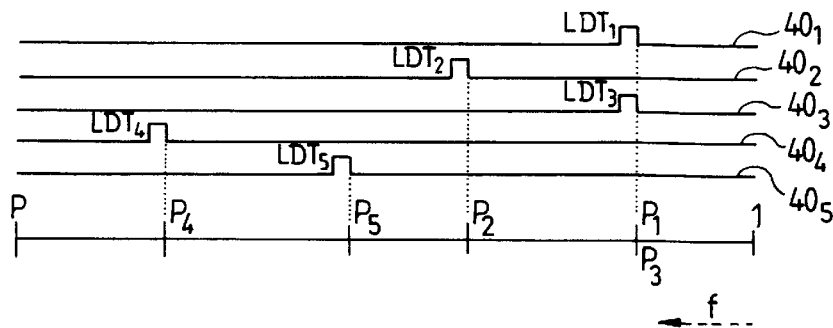
FIGS. 2, 2a and 2b are diagrams showing one mode of operation of the system shown in FIG. 1.
Figure 2A:
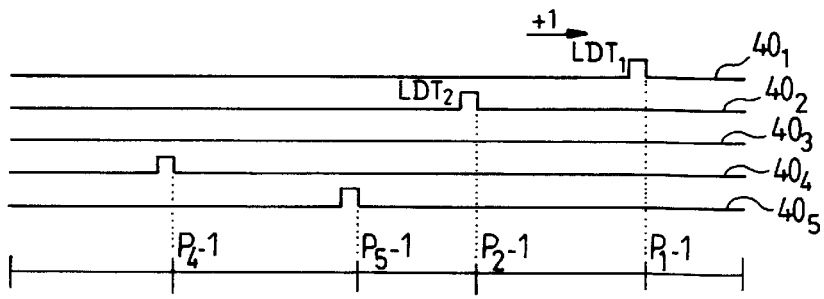

FIG. 2 shows a simplified example including five cells represented by rows $40_1$ to $40_5$. In each row, the flag $LDT_j$ is represented by a pulse whose width is equal to a time interval corresponding to a time position $P_i$, being the number of the corresponding row.

The selector 38 scans the flags LDT from the lowest time position 1 in the direction of the arrow f, i.e. toward the highest time positions. The cell(s) selected for service is (are) the cell(s) for which the time position of the flag LDT is of the lowest rank. In this example, it can be seen that the lowest rank is that of the time positions $P_1$, $P_3$ for which the first and third rows are marked by a priority flag of this rank. In this case, according to the type of server concerned (servicing several cells or only one cell at each service time), the selector 36 services these two cells simultaneously or only one of them, and the choice between the corresponding two rows marked by priority flags at the same time position can be arbitrary.

Figure 3:
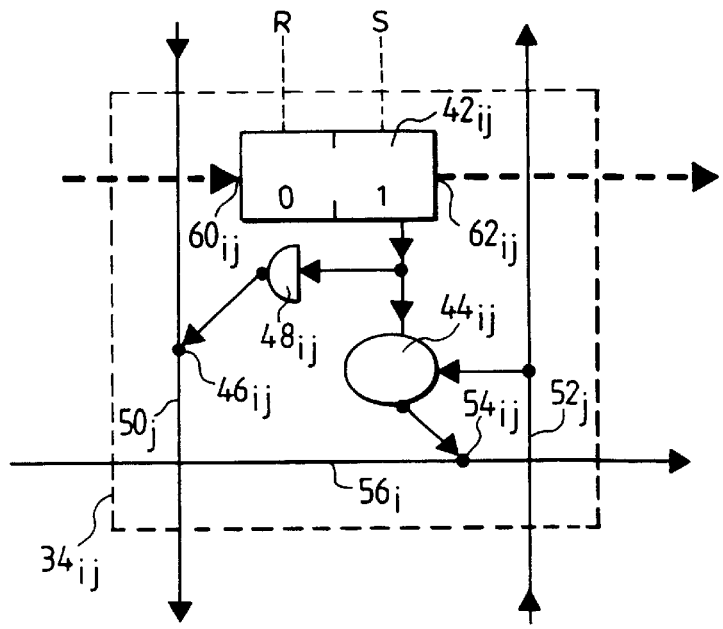
FIG. 3 is a diagram of one embodiment of one component of the system shown in FIG. 1.

One embodiment of an element $34_{ij}$ enabling the use of a single flag, of the LDT type, for example, per row corresponding to a cell will now be described with reference to FIG. 3.

The element includes a memory $42_{ij}$ which, in this example, is a simple memory point or flip-flop storing a binary state 0 or 1, the state 1 here representing the presence of a time priority flag in the element at position j, for example. The output "1" of the memory point $42_{ij}$ is connected to the first input of an AND gate $44_{ij}$ and to an input of a decoupling gate $48_{ij}$ whose output is connected by a hardwired OR gate $46_{ij}$ to the conductor $50_j$ to which is connected the input of rank j of the time selector 38 (FIG. 1).

The second input of the AND gate $44_{ij}$ is connected to a conductor $52_j$ connected to the output of rank j of the selector 38.

The output of the AND gate $44_{ij}$ is connected by a hardwired OR gate $54_{ij}$ to a conductor $56_j$ connected to the input of rank i of the row selector 36.

The memory point $42_{ij}$ also has an input $60_{ij}$ adapted to receive after each clock time, for example after each service time, if the service is periodic, the signal from the memory point of the element of the same row i but of the immediately next higher time position, i.e. from memory point $42(i)(j+1)$. This memory point $42_{ij}$ also has an output $62_{ij}$ adapted to transfer, also after each clock time, its content into the memory point of the element on the some row, but of the immediately next lower rank, i.e. the memory point $42(i)(j-1)$. Finally, the memory point $42_{ij}$ has inputs R and S for marking a priority flag at the required time position when the corresponding cell enters the buffer.

Operation is as follows:

When a "1" is marked in a memory point $42_{ij}$, it is transmitted via the hardwire OR gate $46_{ij}$ and the conductor $50_j$ to the input of rank j of the time position selector 38 so that the latter is made aware of the presence of at least one priority flag (on one of more rows) which is a candidate for selection at that time position. When the selector 38 has selected, from the time positions which are candidates for selection (characterized by the reception of a signal active at "1" on their input), that with the lowest rank, it activates the conductor $52_j$ corresponding to the selected time position to advise the elements of the corresponding column that that position has been selected. In an element in the selected column, the signal active at "1" on the conductor $52_j$, because of a "1" signal at the first input of the gate $44_{ij}$ (if the element has a priority flag marked at "1" in its memory point $42_{ij}$), delivers a "1" signal on the conductor $56_j$, an element of a selected column producing no "1" signal on the conductor $56_i$ if there is no priority flag marked "1" in its memory point.

This "1" signal is transmitted to the selector 36 which, as indicated above, makes the final choice between the cells corresponding to the selected rows which are characterized by the reception of a signal of value "1" on their row.

Finally, the selector 36 commands the elimination of the priority flag in the row corresponding to each cell that has just been serviced.

Each row is reset by a conductor specific to it (not shown).

Finally, a priority flag corresponding to a new cell which has just been received in the buffer can be written into the memory of one of the elements of the corresponding row.

After each clock time (i.e. after each service time if the service is periodic), the content of each memory point $42_{ij}$ is transferred into the memory point $42_i(j-1)$ of the element $34_i(j-1)$ at the next immediately lower time position. Of course, the memory point $42_{ij}$ then receives at its input $60_{ij}$ the content of the memory point $42_i(i+1)$.

Alternatively, instead of moving the contents of the memory points, the ranks in the selector 38 are modified, i.e. the indices 1 to P are shifted right to left, so that the rank j becomes the rank j−1.

FIG. 2 shows the effect of this shift at each clock time and shows that at the next clock time, on row $40_1$, the flag $LDT_1$ is at the time position $P_1$−1 and that the flag $LDT_3$ of row $40_3$ has disappeared, because the corresponding cell has just been serviced.

This figure also shows that the other priority flags are also at the immediately next lower rank time positions relative to the preceding positions shown in FIG. 2.

Figure 2B:
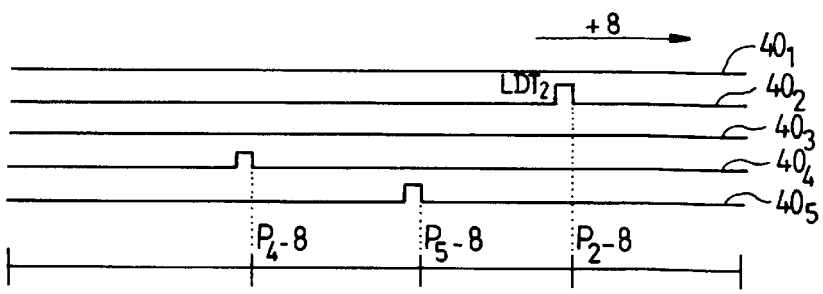

The diagram in FIG. 2b represents the state of the flags of the elements after the cell corresponding to row $40_1$ has been serviced. It shows that the flag $LDT_2$ of row 2 occupies the lowest rank time position (here time position $P_2$−8) and the cell corresponding to the second row will therefore be selected for removal from the buffer.

In the first example described with reference to FIG. 3, there is only one time priority flag for each row. A number of embodiments will now be described in which there are at least two flags per row.

Figure 4A:
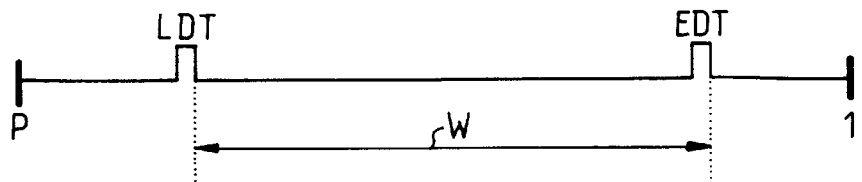
FIGS. 4a, 4b and 4c are diagrams showing the theory of a second mode of operation of the system shown in FIG. 1.
Figure 4B:
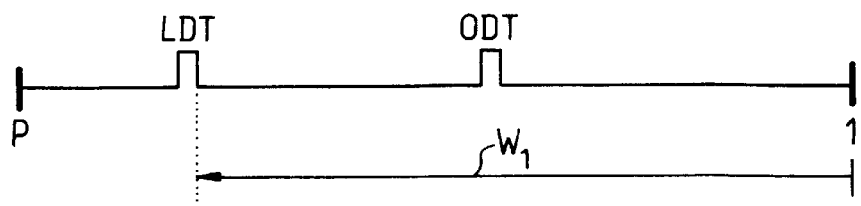
Figure 4C:
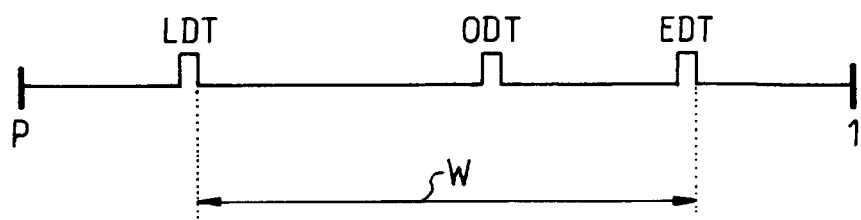

The additional flags can be of various kinds, as shown in FIGS. 4a, 4b and 4c.

The diagram in FIG. 4a shows two flags, namely a flag LDT and a flag EDT.

The flag LDT has the meaning already explained, namely the last position at which the corresponding cell must be serviced. The flag EDT corresponds to the earliest time position from which the corresponding cell can be serviced (earliest departure time). Thus the cell of the corresponding row can be serviced only in a time interval W between positions EDT and LDT.

In the diagram in FIG. 4b, which is analogous to that in FIG. 4a, there is, in addition to the flag LDT, a flag ODT (optimum departure time) which is the optimum time position for departure or service of the cell. The cell can therefore be distributed in a time interval $W_1$ between 1 and LDT, but preferably at or near time position ODT. Note that in this case, although there is no flag EDT, it amounts to the some thing to consider that the flag EDT does exist but has passed the first time position (number 1).

The situation shown in the diagram in FIG. 4c corresponds to the use of three flags LDT, ODT and EDT. As in the first case (FIG. 4a), the corresponding cell can be serviced only between the positions EDT and LDT, i.e. within the time interval W; however, an additional condition is imposed: the cell is preferably serviced in the position ODT, or in the position nearest that position.

Figure 5A:
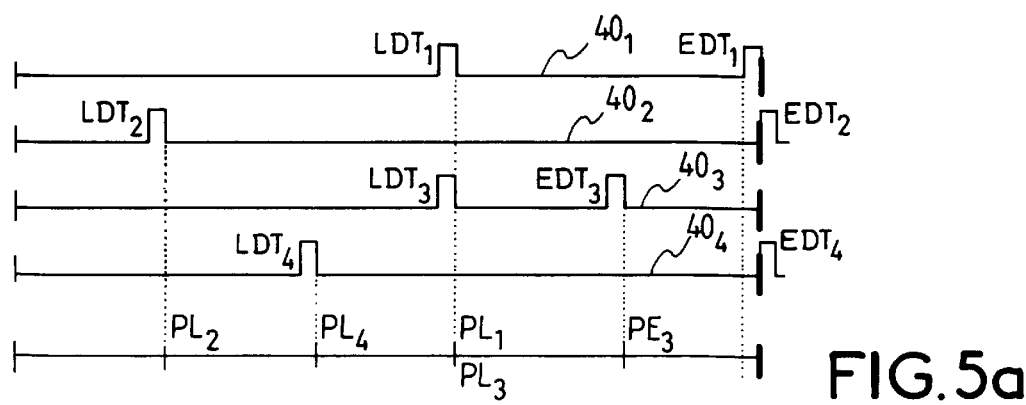
FIGS. 5a and 5b are more detailed diagrams showing modes of operation corresponding to FIGS. 4a and 4b, respectively.

FIG. 5a is a diagram, presented in a analogous fashion to that in FIG. 2, and corresponding to the situation of FIG. 4a, which explains the order of service of the cells when two flags LDT and EDT are provided for each cell. This simplified example includes four rows $40_1$, $40_2$, $40_3$ and $40_4$ (thus corresponding to four cells).

At a given time to the time position of the flags $LDT_1$ and $LDT_3$ on rows $40_1$ and $40_3$ is of the lowest rank. However, the corresponding cells cannot yet be serviced because their flags EDT (respectively $EDT_1$ and $EDT_3$) have not yet gone beyond time position 1. In contrast, the cells corresponding to rows $40_2$ and $40_4$ can be serviced because their flags EDT have gone beyond position 1. In this situation, the cell corresponding to row $40_4$ is selected to leave the buffer, because its flag $LDT_4$ is at a time position $PL_4$ which is lower than the time position $PL_2$ of the cell corresponding to row $40_2$.

At the next service time (not shown), if no other cell has been introduced into the system in the meantime, the cell corresponding to the first row $40_1$ can be selected to leave the buffer, as its flag $EDT_1$ will then have passed position 1 and the time position of its flag $LDT_1$ will be of the lowest rank.

Each signal EDT going to the position 1 is registered in the selector 36. To this end it includes a memory (or register), for example a one-bit memory or register, for each row and which indicates whether the flag EDT has passed beyond the first time position or not. If the first time position has been passed, the cell concerned can participate in the selection.

Figure 5B:
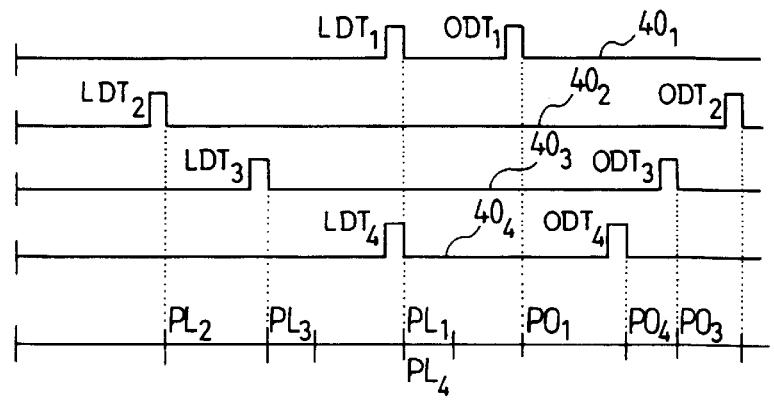

The diagram in FIG. 5b corresponds to the situation represented in FIG. 4b: two flags LDT and ODT are allocated to each cell.

The selector 38 first preselects the rows $40_1$ and $40_4$ for which the time position of the flags LDT is of the lowest rank and, from these two preselected rows, it then chooses the row $40_4$ for which the time position of the flag $ODT_4$ is closest to the position 1. Thus the cell corresponding to the row $40_4$ can be serviced.

Note also in FIG. 5b that the cell corresponding to the row $40_2$ has a flag $ODT_2$ closest to the position 1, but that that row has not been selected because the time position of its flag $LDT_2$ is not of the lowest rank.

If the flags ODT are used, and if they go beyond the first time position, it is also necessary to store this fact in the selector 36 until the corresponding cell has been serviced. To this end the selector 36 includes a memory, for example a one-bit memory whose value, 0 or 1, indicates whether the flag ODT has passed beyond the time position 1 or not.

It is not essential to describe an example of operation corresponding to the situation represented in FIG. 4c, as that operation is easily deduced from the combination of the examples described with reference to FIGS. 5a and 5b.

There are various ways to provide a system 30 for servicing cells each of which has two or three different types of time priority flag.

A first solution is to provide a number of matrices 32 equal to the number of different types of priority flag. A second solution is to provide a single matrix 32 in which each element $34'_{ij}$ has a storage capacity corresponding to the number of priority flags of different types. In this case, the associated logic is different from that described with reference to FIG. 3.

Figure 6:
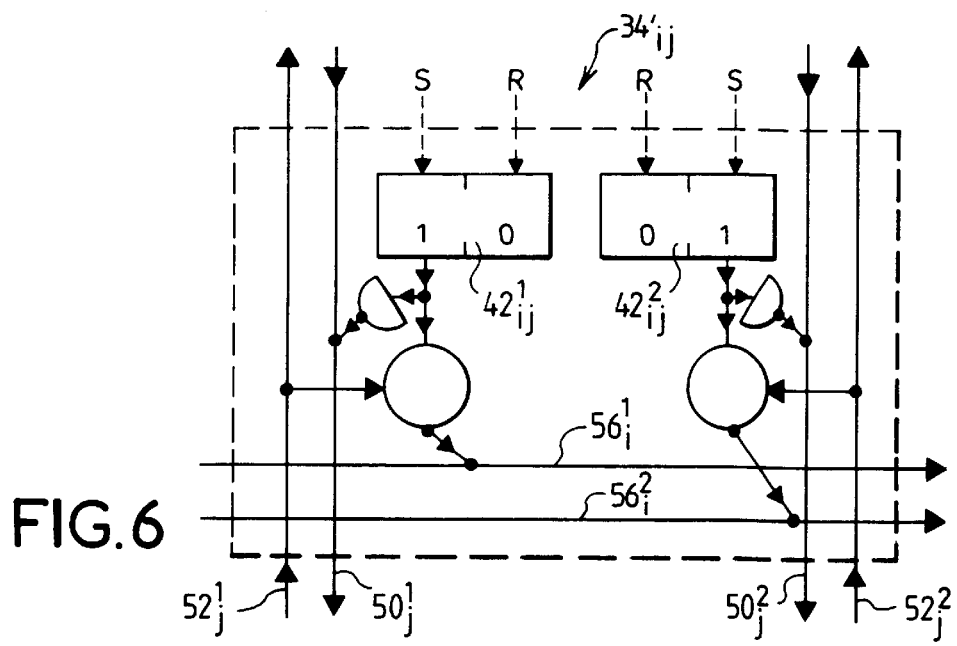
FIG. 6 is a diagram analogous to that of FIG. 3, but relating to a variant.

FIG. 6 shows one embodiment of the element $34'_{ij}$ corresponding to this situation, with two types of flag. Thus the element has two memory points $42_{ij}^1$ and $42_{ij}^2$ and each of these points, or registers, is associated with a logic system comprising an AND gate and a hardwired OR gate, as in the embodiment shown in FIG. 3. In this case, the selector 38 (FIG. 1) includes, for each time position, two outputs and two inputs and therefore two conductors $50_j^1$ and $50_j^2$ connected to the two inputs of rank j of the selector 38 and two conductors $52_j^1$ and $52_j^2$ connected to the two outputs of rank j of the selector 38. There are also two conductors $56_i^1$ and $56_i^2$ connected to the double inputs of rank i of the cell selector 36.

The memory point $42_{ij}^1$ stores the flag LDT and the memory point $42_{ij}^2$ stores the other flag (EDT or ODT). In the pairs of input and/or output terminals of the selectors 36 and 38, one element of one pair corresponds to one flag and the other element of the pair corresponds to the other flag.

In a third, preferred, embodiment, there is only one memory point per element $34_{ij}$ but means are provided for recognizing the nature of the flags on the same row.

Thus, on each row of elements, a number of elements is marked having a flag which is equal to the number of flags of different types provided for each cell. In other words, all the elements are identical to each other and, taken in isolation, an element marked as a flag LDT is no different to an element marked as a flag EDT or ODT.

Figure 7A:
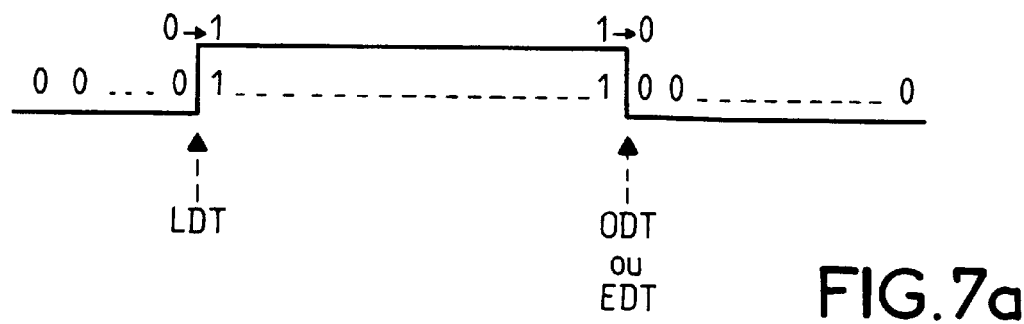
FIGS. 7a and 7b are diagrams showing flags using transition coding.
Figure 7B:
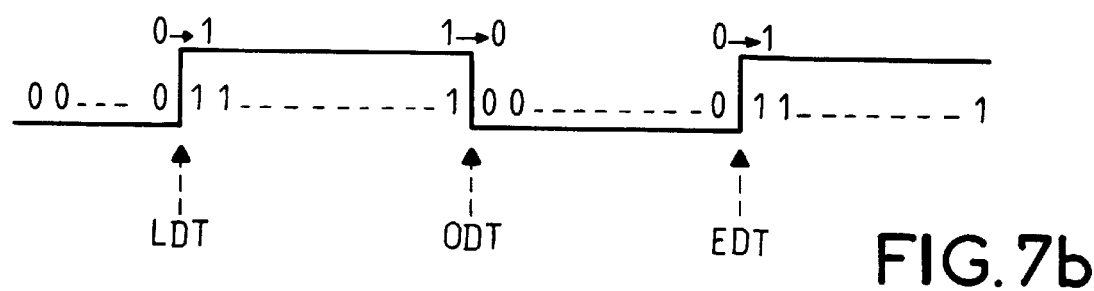

A first way to determine the nature of the flag marked in the element is to code the presence of a flag by a transition rather than by the polarity of a bit. For example, when two flags are used, the presence of one is marked by a 0–>1 transition and that of the other by a 1–>0 transition (FIG. 7a). When three flags are used, the presence of the first is marked by a 0–>1 transition, that of the second by a 1–>0 transition and that of the third by another 0–>1 transition. FIG. 7b shows this latter example.

A second way is for the presence of a flag to be marked by the polarity of a bit and the flags of different types to be distinguished by their relative time positions on a row.

Thus the flag LDT is recognized by the fact that it is the flag which has the highest rank time position on a row. To detect the flag LDT, a row can be searched by scanning it from the last time position, that of rank P, in the decreasing direction from left to right.

The flag EDT can be recognized simply when it goes to time position 1. It is not necessary to detect this flag beforehand because, if it has not gone to position 1, it is premature to service the cell associated with the corresponding row.

The following approach can be used to determine the position of the flags ODT: when the position of the flag LDT has been detected by a left to right flag search restricted to the cells which can be serviced, i.e. whose flag EDT has already passed beyond the position 1, and after the lowest rank flag(s) LDT have been preselected, a second flag ODT search can be conducted for the rows preselected in this way, from right to left, and from position 1 toward the higher time ranks. Note that this search for the positions of the flags ODT is necessary only for the cells preselected in the first search, and therefore on the rows for which the flags LDT have the lowest time rank. As an alternative to this, an ODT flag search can be effected from left to right from each preselected flag LDT.

The general structure of the control system 30 for this embodiment is the same as that described with reference to FIG. 1. The flags LDT, EDT and ODT are marked on the row 40$_j$ corresponding to a cell at the time positions required by the management unit referred to above.

As explained above, for each row, the selector 36 stores information representing when the flag EDT goes or the flags EDT and ODT go beyond the first time position 1.

Accordingly, in the situation represented in FIG. 4c, where three flags are allocated to each row, namely the flags LDT, EDT and ODT, the selector 36 includes a sequencer with two bits per row.

A sequencer of this kind characterizes which of the following four states currently applies to each row:

State 1: flag EDT has not yet gone beyond time position 1.

State 2: flag EDT has gone beyond time position 1 (causing a change from state 1 to state 2), but not flag ODT.

State 3: flag ODT has also gone beyond time position 1 (causing a change from state 2 to state 3).

State 4: there is no active cell on this row.

The search for flags LDT and then ODT as described above is therefore effected only on the rows in state 2 or 3, is premature for the rows in state 1 and is not required for the rows in state 4.

State 4 (where a row does not correspond to an active cell) can also be used with advantage for the following two functions:

The first function avoids erasing the content of the elements of a row whose cell has just been serviced. Instead of commanding the erasing of the flags of that row in the system, it is sufficient to place the sequencer of the corresponding row in state 4 in the selector 36. This avoids busying the system for the time it takes to erase the content of the row and the system can therefore operate faster. Thereafter, when marking the priority flags for a new cell in a row in state 4, all the elements of that row are repositioned, with the "active" polarity for the elements marked with a flag, and with the opposite polarity for all the other elements.

The second function eliminates a cell in the system in a simple manner and without interrupting its operation. It is also sufficient to position the sequencer of the corresponding row in state 4 in the selector 36. Note that although, up until now, it has been assumed that each cell had to be serviced normally to leave the buffer, the management unit can decide to eliminate a cell in the system prematurely, for example to solve a congestion problem.

A cell selection operation in the situation in which there are two flags LDT and ODT for each cell will now be described with the assistance of the diagrams in FIGS. 8 and 9.

Figure 8:
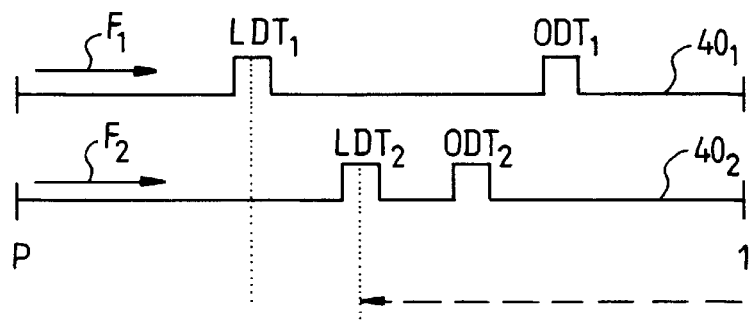
FIGS. 8 and 9 are diagrams showing a mode of operation of the system shown in FIG. 1 equipped with the element shown in FIG. 6 or FIG. 11.

FIG. 8 shows the principle of the first search for flags LDT on a row 40$_1$ corresponding to a first cell and on another row 40$_2$ corresponding to a second cell.

In this first search phase, for each row in state 2 or 3, a search is conducted for the first flag, i.e. the flag LDT, from left to right, i.e. from the time position P toward the time position 1, as shown by the arrows $f_1$ and $f_2$ in FIG. 8. During this search, the first flag encountered on each active row is necessarily a flag LDT. In this example, it can be seen that the flag LDT$_2$ of the row 40$_2$ is closest to the position 1 and will therefore be preselected by the selector 38.

However, it can happen that more than one row has a flag LDT at the same time position and that the latter is preselected. The diagram in FIG. 9 shows this situation and that the rows 40$_1$ and 40$_2$ then have flags LDT$_1$ and LDT$_2$ at the same preselected time position. Also, the search process continues on the preselected rows during the first search phase. This second search phase is always effected from left to right, i.e. toward the lower time positions, from the preselected time position LDT, in order to search for the flags ODT. The cell(s) whose flag ODT is the closest to the position 1 is (are) then selected. In the FIG. 9 example, the flag ODT$_1$ is in this situation. Finally, the search signal propagates on the row 40$_1$ corresponding to the selected cell as for as the selector 36 to indicate to it the selection of the cell corresponding to that row.

Figure 9:
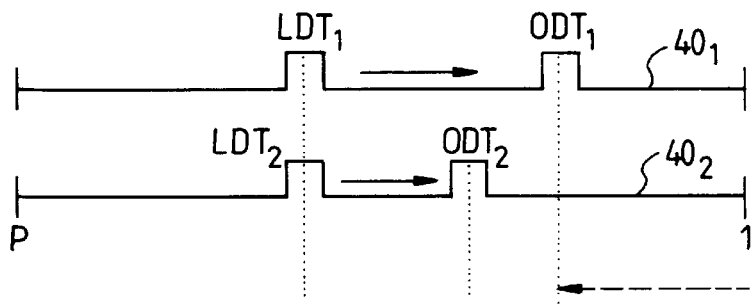

In the example shown in FIG. 9, the two rows 40$_1$ and 40$_2$ are in state 2 (because their flag ODT has not gone beyond position 1). It is also possible for one or more preselected rows to be in state 3, i.e. for their flag ODT to have gone beyond position 1 already. For such rows preselected in the first search phase, the search signal propagates directly from the preselected position LDT to the selector 36 to indicate to it selection of the cell corresponding to that row. As explained above, the selector 36 then gives priority to choosing, from all the rows selected by the reception of the search signal, those which are in state 3.

Figure 10:
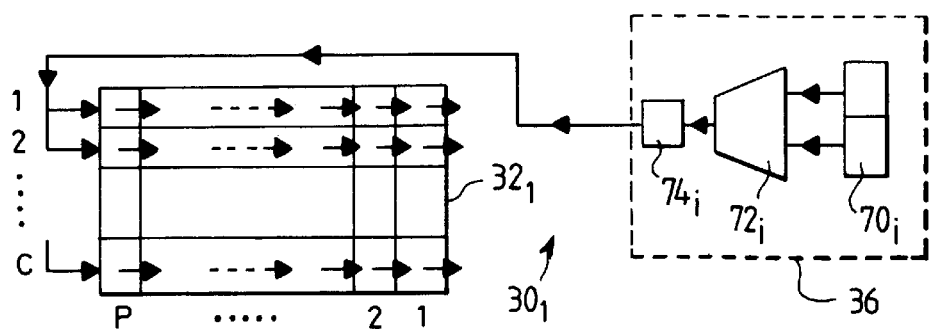
FIG. 10 is a diagram showing another embodiment of the system shown in FIG. 1.

FIG. 10 is a diagram showing a system 30$_1$ for effecting the search operations required to select the cells to be serviced, in which each of the elements of the matrix 32$_1$ stores a single time flag, although a plurality of flags of different types are allocated to each row corresponding to a cell.

The system 30$_1$ has the same matrix structure as that shown in FIG. 1. Thus only the parts of the system 30$_1$ which differ from the system 30 are shown.

The cell selector 36 includes, for each row of rank i, a two-bit memory 70$_i$ and a decoder 72$_i$ whose output is connected via an inverter 74$_i$ to an input of the element of the last rank (P) of the row i concerned.

The two bits of the memory 70 allocated to row i represent the four possible states mentioned above, namely:

State 1 : flag EDT has not yet gone beyond time position 1;

State 2 : flag EDT has gone beyond time position 1, but not flag ODT;

State 3 : flags EDT and ODT have both gone beyond time position 1;

State 4 : there is no active cell corresponding to that row.

For each row (in this example), the decoder 72$_i$ supplies at its output a "1" signal signifying that the flag search is authorized for the cell corresponding to this row if the two-bit code in the memory 70$_i$ corresponds to state 2 or state 3, i.e. there is an active cell for that row and at least its flag EDT (and possibly also its flag ODT) has passed beyond the position 1.

Under these conditions, a "0" signal appears at the output of the inverter 74$_j$ if the selector 36 produces a search signal active on a row i and that signal is applied to the input of the element of rank P of row i.

As will be explained later, instead of the above, a "1" active search signal can be used; however, a "0" active search signal simplifies implementation of the elements of the matrix 32$_1$ from FIG. 10.

Figure 11:
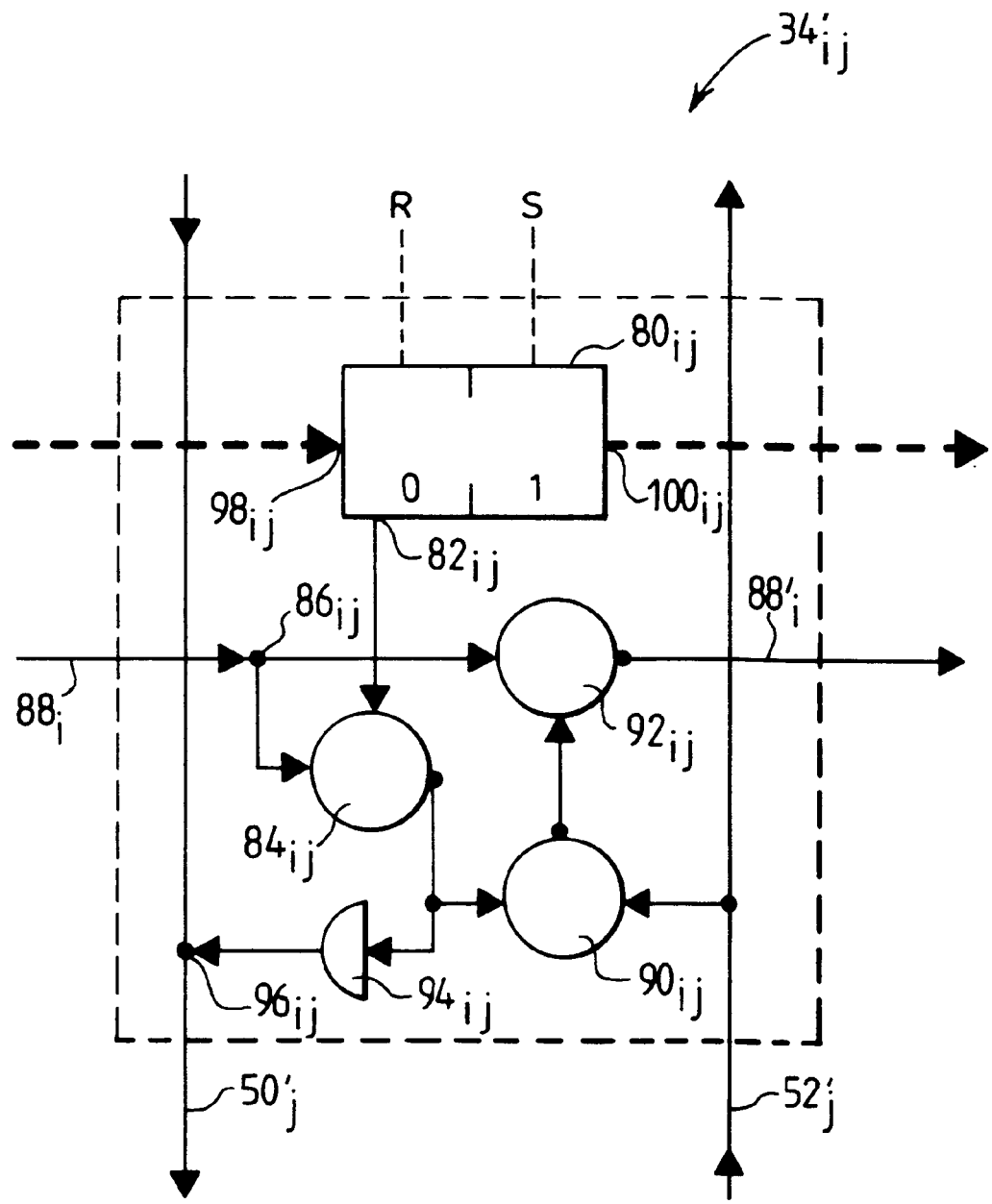
FIG. 11 is a diagram analogous to that of FIGS. 3 and 6, but relating to another variant.

FIG. 11 shows an element 34$_{ij}$ which is part of the matrix 32$_1$ of the system 30$_1$ from FIG. 10.

The element $34_{ij}$ includes a memory point $80_{ij}$ for masking the presence of a flag LDT, EDT or ODT. In this first embodiment, the presence of one of the above flags is manifested by a "0" output of the memory point $80_{ij}$. This active flag output $82_{ij}$ is connected to a first input of a NOR gate $84_{ij}$, whose second input is connected, at $86_{ij}$, to a conductor $88_j$ delivering a flag search signal from the element of higher rank.

The output of the NOR gate $84_{ij}$ is connected to the conductor $50'_i$ (which is analogous to the conductor $50_j$ in FIG. 3) via a decoupling gate $94_{ij}$ and a hardwired OR gate $96_{ij}$.

The output of the NOR gate $84_{ij}$ is also connected to the first input of an AND gate $90_{ij}$ whose second input is connected to the conductor $52'_i$ whose function is similar to that of the conductor $52_j$ described with reference to FIG. 3, except that the signal on the conductor $52'_i$ from selector 38 is active at "0" in this embodiment to signify that the selector 38 is selecting this time position as that of the lowest rank (and therefore that the time position is not retained when it transmits a "1" signal on the conductor $52'_i$).

The output of the AND gate $90_{ij}$ is connected to an input of an OR gate $92_{ij}$ having another input connected to the conductor $88_i$ for receiving the search signal from the element of higher rank. The output of the OR gate $92_{ij}$ is connected to a conductor $88'_i$ for transmitting the search signal to the element of lower rank.

The memory point $80_{ij}$ has a transfer input $98_{ij}$ which receives at each clock time (i.e. at the end of each service time if the service is periodic) the content of the memory of the element from the same row and of higher rank and an output $100_{ij}$ for transferring its content to the memory of the element of the same row i and of lower rank. There are also inputs R and S for marking each memory point "1" or "0".

Operation is as follows:

To select one or more cells to be serviced in the buffer, the first flag search phase in the system searches all rows corresponding to an active cell and for which at least the flag EDT has gone beyond position 1 (and thus the rows in state 2 or 3) for a flag LDT that has the lowest time position.

To this end, a search is effected of the type described with reference to FIG. 8 (arrows $f_1$ and $f_2$), from left to right, i.e. from time position P toward time position 1 (in the direction of decreasing indices j) by means of the search signal active at "0" supplied by the selector 36 at the output of the inverter $74_i$ of each row in state 2 or 3 (FIG. 10). Each search signal attempts to propagate progressively through the successive elements of a row. At the level of an individual element, a search signal may be received from the element of lower rank at the input $88_i$ and possibly transmitted to the element of lower rank at the output $88_i$ (FIG. 11).

In each element $34'_{ij}$ of the matrix $32_1$, when a flag "0" is present in the memory point $80_{ij}$ and when, simultaneously, a search signal active at "0" is received by the element at the input $88_i$, the output signal of the NOR gate $88_{ij}$ is at "1" signifying that a flag has been detected as a candidate for selection.

This "1" signal at the output of the gate $84_{ij}$ is transmitted to the conductor $50'_i$ and therefore to the corresponding input of the time position selector 38 to tell it that at least one flag which is a candidate for selection has been detected at the time position corresponding to the rank of that element. In other cases, i.e. when the element does not receive a search signal active at "0" at the input $88_i$, or when there is no flag marked "0" in its memory $88_{ij}$, the output of the gate $84_{ij}$ is at "0"; an element of this kind is therefore not a candidate for selection. Note that, when an element has no flag marked "0" in its memory $80_{ij}$, the output of the gate $84_{ij}$ is at "0"; thus, regardless of the polarity, "0" or "1", of the search signal received at the input $88_i$, the state of the search signal is then transmitted transparently and with the same polarity through the OR gate $92_{ij}$ to the output $88_i$ to the next element.

During the first phase of the search for the flag LDT to be selected, the selector 38 first applies a "1" signal to all the conductors $52'_i$ (signifying "time position not retained") in order to prevent the propagation of any active search signal beyond the first element for which the presence of a flag has been detected. In an element of this kind, the output of the AND gate $90_{ij}$ is at "1" because a "1" signal is received on the conductors $52'_i$ and $88_i$, which leads to a "1" signal (search inactive), produced by the OR gate $92_{ij}$, at the output $88'_i$ to the next element.

When the propagation of the search signals through the elements of all the rows in state 2 or 3 has stabilized, the selector 38 searches all the time positions at its inputs (connected to the conductors $50'_i$) to identify that for which the input is at "1" (denoting the presence in that column of at least one element having a flag LDT, and therefore a candidate for selection) and then to determine the rank j of the time position LDT of the lowest rank which is a candidate for selection.

The second flag search phase then determines the position of the flags ODT for the rows preselected during the first phase of the search for flags LDT. To this end, the search is continued by authorizing propagation of the search signal active at "0" on each row beyond the retained time position. At the level of an element, to enable the search to continue in this way from the time position j retained, the selector 38 delivers to the conductor $52'_j$ of this only preselected position j "0" signal (in this embodiment) signifying that it is selecting that time position as the time position LDT of the lowest rank which is a candidate for selection. At the some time, the selector 38 maintains a "1" signal on the conductor $52'_i$ of all the other time positions.

In each element of this column that has detected a flag (LDT) which is a candidate for selection, this "0" signal causes the signal at the output of the OR gate $92_{ij}$ to go from "1" to "0", i.e. it then authorizes the transmission of a search signal active at "0" to the output $88'_i$ from the element $34'_{ij}$ to the next element.

The search for flags ODT then continues, still from left to right, on the rows preselected in the first phase, as shown previously in FIG. 9, by the arrows from the selected position LDT. This search for flags ODT is effected in an analogous manner to the first phase of the search or flags LDT. Accordingly, as during the first phase, in each element that has detected a flag which is a candidate for selection, the conductor $50'_i$ active at "1" applies to the corresponding input of rank of the selector 38 a signal indicating the presence at that time position of at least one flag ODT that is a candidate for selection.

When the propagation of the search signals on all the preselected rows has stabilized, the selector 38 searches its inputs to determine the time position having (at least) one flag ODT that is a candidate for selection whose rank is the closest to time position 1.

When it has effected this selection, as in the first phase, the selector 38 delivers on the conductor $52'_j$ of this single preselected position; a "0" signal signifying that it is selecting that time position as the position ODT which is a candidate for selection of the lowest rank. In each element of this column that has detected a flag (ODT) which is a candidate for selection, this "0" signal causes the signal at the output of the OR gate $92_{ij}$ to go from "1" to "0", i.e. it then authorizes the transmission of a search signal active at "0" to the output $88_i$ of the element $34'_{ij}$, and the search signal active at "0" transmitted can then propagate on the selected row through the subsequent elements as far as the selector 36.

If, during the first search phase (search for flags LDT), the flag ODT of a preselected row has already gone beyond the time position 1 (this is the case of a row in state 3 whose situation is already recorded in the corresponding memory $70_i$ of the selector 36), the search signal for a row of this kind will reach the selector 36 directly at the start of the second ODT flag search phase. In contrast, for the other preselected rows which are in state 2 (the flag ODT has not gone beyond the position 1), the search signal does not reach the selector 36 unless its flag ODT is at the lowest rank time position.

The diagrams in FIGS. 12a to 12g show the various situations that can arise during the search operation.

In these diagrams, the search signal is denoted SSP. A search operation active on a row corresponds to SSP=0 and the signal SSP=1 signifies that a search is not being effected on the corresponding row.

Figure 12A:
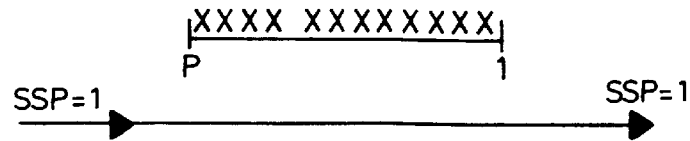
FIGS. 12a to 12g are diagrams showing modes of operation of the system shown in FIG. 1 equipped with the element shown in FIG. 11.

FIG. 12a illustrates the situation of a row in state 4 corresponding to no active cell in the system, i.e. such that no search signal SSP is active for this row and no passage of a flag beyond position 1 has been detected unduly and regardless of the (immaterial) content of the memory points of the elements of this row.

Figure 12B:
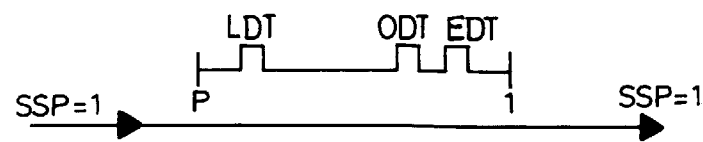

In the situation represented in FIG. 12b, because the flag EDT of the row has not yet gone beyond position 1, no search signal is sent (SSP=1); this is the case of a row in state 1.

Figure 12C:
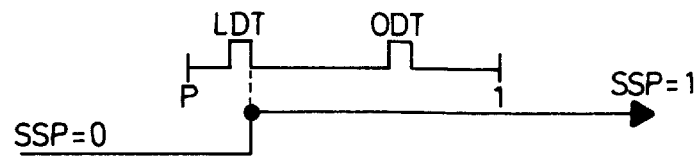

The situation of FIG. 12c, for which the flag EDT has already gone beyond position 1, corresponds to a row in state 2. An active search signal (SSP=0) is therefore transmitted. However, it is assumed here that the row is not selected because its flag LDT is not the one with the time position closest to 1.

The search signal SSP is then forced to "1" in the element marked by the flag LDT that is not preselected (stop downstream search).

Figure 12D:
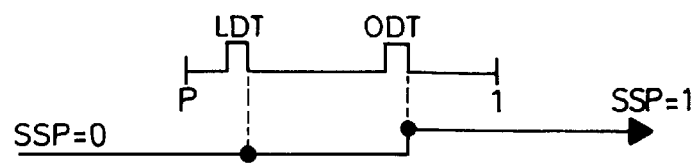

The situation of FIG. 12d also corresponds to that of a row in state 2, but here it is assumed that its flag LDT has been preselected because it has the lowest time position of all the flags of this type. However, it is also assumed that the row was not selected during the search for flags ODT (another row was selected because the flag ODT of that other row had a time position closer to 1).

Figure 12E:
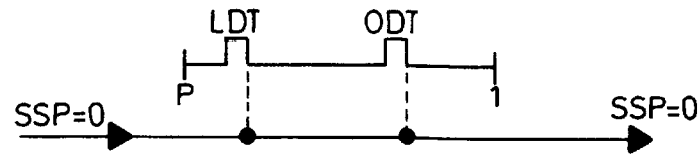

In the situation shown in FIG. 12e, the row, also in state 2, has been selected, its flag LDT having the lowest rank time position and, likewise, among the preselected rows, its flag ODT has the position closest to 1.

Figure 12F:
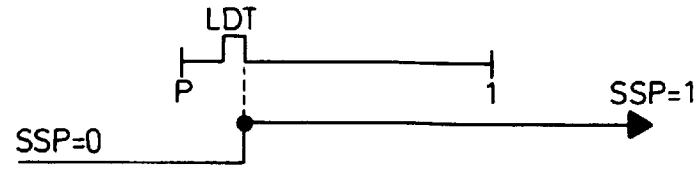

In the situation of FIG. 12f, the row is in state 3 (its flag ODT has gone beyond position 1) and here it is assumed that the row has not been preselected because the time position of its flag LDT is not that with the lowest rank.

Figure 12G:
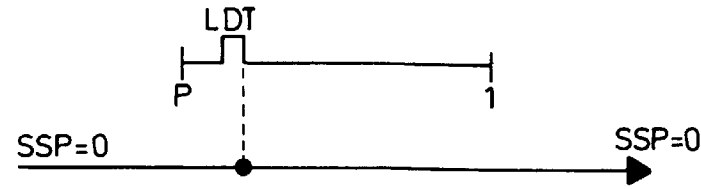

Finally, the situation represented in FIG. 12g is similar to that of the diagram in FIG. 12f (row in state 3), but here it is assumed that the row has been selected because the time position of its flag LDT has the lowest rank, and was therefore preselected during the first phase of the LDT flag search by the means 38.

If several rows have been selected at the end of the selection process in the matrix by the selector 38 and if only one cell must be processed at a time, the selector 36 gives priority to choosing a cell corresponding to a selected row whose flag ODT has gone beyond position 1 (and therefore in state 3).

If several rows in state 3 are selected, the choice between them is an arbitrary one, for example.

If none of the selected rows has a flag ODT that has gone beyond position 1 (all the selected rows are in state 2), the selector 36 chooses one cell from among the selected rows arbitrarily.

The management unit controls the output of the selected cell from the buffer. At the same time, the selector 36 can command the erasing of all the flags (meaningful at "0" in this example) in the elements of the corresponding row.

Alternatively, instead of erasing flags in the elements of the released row, only the memory $70_i$ of the selector 36 (FIG. 10) is placed in the row state 4 corresponding to no active cell in the system, i.e. no search signal SSP is sent and no passage of a flag beyond the position 1 is detected unduly and regardless of the content of the memory points of the elements of that row. This variant (with no erasing of the content of the elements) has the advantage of reducing the processing time needed per service time and therefore of increasing the operating frequency of the device.

In this case, when a new cell is introduced into the device, it is allocated a row previously inactive in state 4 and the memory points of all the memory elements of the row are positioned in parallel (so as to introduce a "0" for the time positions marked by a flag and a "1" for all the other time positions); thus, for all the memory points of the row, the residual content (which has not been erased previously) is replaced by a new content.

The forcing to state 4 of the memory $70_i$ of a row in the selector 36 is also of benefit if a cell in the system is to be eliminated prematurely.

For this, it is sufficient to position the memory $70_i$ of the row corresponding to the cell to be eliminated in state 4 to render it inactive in the system.

Thus the premature elimination of a cell (or, more generally, an object) in this system is a particularly simple and fast operation, since it requires no temporary cessation of operation of the device).

Such elimination is useful, for example, if it is required to remove some cells from the buffer to free up memory space for cells having a higher priority, or if a cell has not been serviced although its flag LDT has gone beyond time position 1, or if a cell is defective.

As mentioned above, a variant of the system described with reference to FIGS. 10, 11 and 12 can also use an active search signal SSP at "1". An active search signal at "0", corresponding to the embodiment described above, nevertheless enables simpler implementation of the elements of the matrix $32_1$ from FIG. 10, such as the element $34'_{ij}$ from FIG. 11.

In a variant of the above kind, the theoretical operation remains the same. The implementation differences are as follows:

Compared to FIG. 10, in the selector 36, the signal at "1" at the output of the decoder $72_i$ (signifying that the flag search is authorized for the cell corresponding to that row if the two-bit code from the memory $70_i$ corresponds to state 2 or state 3) constitutes directly the search signal SSP which must now be active at "1". The inverter $74_i$ is therefore eliminated in this case.

Figure 13:
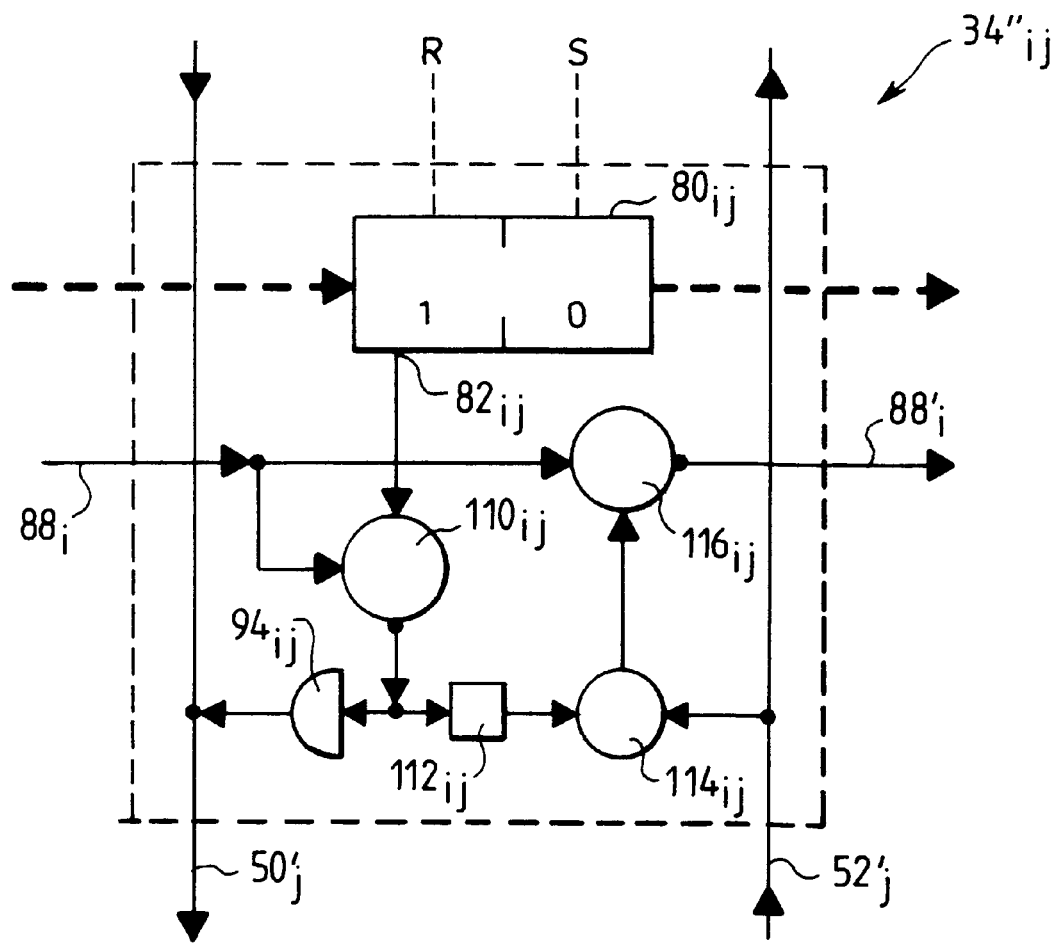
FIG. 13 is a diagram analogous to that of FIG. 11, but relating to a further variant.

FIG. 13 shows the theoretical implementation of an element $34''_{ij}$ for an active search signal SSP=1. The element $34'_{ij}$ shown in FIG. 11 corresponds to a search signal SSP=0.

There is a memory point $80_{ij}$ or register in the element $34''_{ij}$, as in the element $34'_{ij}$ in FIG. 11. However, in this memory point, the presence of a flag is marked by a "1", rather than a "0" for the element $34'_{ij}$.

The output $82_{ij}$ of the memory point $80_{ij}$ is connected to the first input of an AND gate $110_{ij}$ whose second input is connected to the input conductor $88_i$.

The output of the AND gate $110_{ij}$ is connected to the input of a decoupling gate $94_{ij}$ whose output is connected to the conductor $50'_j$. This output of the AND gate $110_{ij}$ is also connected to the input of a switch $112_{ij}$ whose output is connected to the first input of an OR gate $114_{ij}$ whose second input receives the signal from the conductor $52'_j$.

The output of the OR gate $114_{ij}$ is connected to an input of an AND gate $116_{ij}$, a second input of which is connected to the input $88_i$.

Finally, the output of the AND gate $116_{ij}$ is connected to the output conductor $88'_i$.

Operation is as follows:

The conductor $52'_i$ from the selector 38 is here active at "1" to signify that the selector 38 is selecting this time position as that of the lowest rank, although in the foregoing description the counterpart conductor is active at "0" in the some situation.

The AND gate $116_{ij}$ authorizes the transmission of an active search signal SSP=1 if, simultaneously, the element $34'_{ij}$ receives a signal SSP=1 at the input $88_i$ and either its time position has not been selected by the selector 38 or the element is not a candidate for selection.

By comparison, in the embodiment shown in FIG. 11, the OR gate $92_{ij}$ authorizes the transmission of an active search signal SSP=0 if, simultaneously, the element receives a signal SSP=0 and either the element is not a candidate for selection or its time position has not been selected by the selector 38.

The only difference compared to the description of the various situations that can arise during the search operation and which are shown by the diagrams in FIGS. 12a to 12g is the replacement of SSP=0 by SSP=1.

Note that the embodiment just described, in particular with reference to FIGS. 10 to 13, is not limited to the possibility of using three flags per cell. A number of flags greater than three can be used.

In applications of a scheduler described above, the order of service of the cell to be removed from the buffer is decided at the time of service itself. In applications of an FIFO type queue in which the order of service of the cell is decided as soon as it arrives in the buffer, the system enables the cells to be selected in the order in which they are received.

To this end, it is sufficient to agree that the P columns of the matrix no longer correspond in this case to time positions but simply to ranks of cells in the FIFO queue.

In this case, a single flag per cell is sufficient to characterize its rank relative to the other cells in the queue.

A pointer designating the rank of the last cell placed in a queue is used to determine the next rank allocated to a newly received cell. It is therefore necessary to effect a shift of one position of lower rank at each effective service time (not necessarily at each clock time, unless the service times are periodic at each clock time).

What is more, a fixed hierarchy of priorities can be introduced between different categories of cells, for example between a category which has a guaranteed grade of service and another which does not. In a simplified example of this kind, cells of lower priority are used only if all cells of higher priority have been processed.

To distinguish this kind of fixed priority between cells, a priority bit can be provided for each row in the selector 36. The priority bit is used in the selector 36 to inhibit the generation of a search signal in the case of a cell of lower priority which must not be processed if any cells of higher priority remain within the system. A priority bit indicating the presence of a cell of lower priority on a row can also be used to prevent the shifting of its time positions on each clock signal. Accordingly, all cells of lower priority remain programmed in the same time position if cells of higher priority have not all been serviced. A counter can be associated with the buffer to monitor the processing of cells, indicating the number of higher priority cells remaining in the system, the cells of lower priority being processed only when the counter reaches the value zero.

What is claimed is:

1. A system for determining an order of service of temporarily stored objects, at least one priority flag being attached to certain objects, said system comprising:

storage unit comprising a plurality of memory elements organized into a C×P matrix into including C subsets of P memory elements, wherein C is a total number of objects stored temporarily, each of said subsets correspond to one of said objects, said P memory elements of each subset correspond to P time positions, and each of said memory elements can store at least one time priority flag, and time position selector means for determining, within the matrix, and from all said subsets, which of said memory elements currently store the time priority flag and correspond to the time position having lowest value, and means for writing the time priority flag for a given object into one of said memory elements corresponding to a time position allocated to that object.

2. The system claimed in claim 1 further comprising object priority selector means for selecting at least one of said subsets preselected by said time position selector means.

3. The system claimed in claim 1 wherein, to allow for an advancing clock time, at each clock time an offset of one time position is introduced between said time priority flags stored in the memory elements of each subset and a rank corresponding to the time position so that a new rank corresponds to a next lower time position.

4. The system claimed in claim 3 wherein said offset by one time position is effected by transferring the content of each memory element to a next element corresponding to the next lower time position.

5. The system claimed in claim 2 wherein said object priority selector means are connected to said memory elements by C incoming conductors each corresponding to one subset and transmitting a selected object signal, and said object priority selector means effect a final selection of at least one object to be serviced from the objects corresponding to the subsets transmitting the selected object signal.

6. The system claimed in claim 1 wherein said first time position selector means are connected to said memory elements by P sets of common conductors corresponding to said P time positions, each of said sets of common conductors comprising:

an incoming common conductor for receiving a time position signal that is a candidate for selection, and an outgoing common conductor for transmitting a retained time position signal, and wherein said first time position selector means select, among the P time position signals received on said incoming common conductors, a first time position signal which is a candidate for selection corresponding to a time position having a smallest value and indicate a selected first time position by transmitting the retained time position signal on said outgoing common conductor corresponding to the selected first time position.

7. The system claimed in claim 1 wherein, for each subset, said time position of said memory element containing said time priority flag represents a required time of servicing the object corresponding to that subset relative to the other objects, said first time position selector means giving priority to selecting the objects whose priority flag is in the memory element corresponding to said time position with a lowest value.

8. The system claimed in claim 5 wherein each memory element:

activates a corresponding incoming common conductor of said first time position selector means to transmit thereto a time position signal which is a candidate for selection if said time priority flag is stored in the memory element, receives from said first time position selector means, over an outgoing common conductor for each time position, a retained time position signal if said first time position selector means indicate that said time position of the memory element has been selected, and generates, on the incoming conductor of the corresponding subset, a selected object signal addressed to said priority object selector means, if, simultaneously:
   said time priority flag is stored in the memory element, and
   said retained time position signal is received from said outgoing common conductor of said first time position selector means.

9. The system claimed in claim 7 wherein the time priority flag stored in one of P memory elements for each of said subsets represents a required latest time for servicing the corresponding object.

10. The system claimed in claim 9 wherein at least one of two additional time priority flags is is stored in said memory elements of each of said subsets, said additional time priority flags comprising:

an earliest authorized selection time position flag of an earliest authorized selection time position before which the object cannot be serviced, said earliest authorized selection time position flag having a time position of smaller value than that of said time priority flag representing the latest required time for service, and an optimum selection time position flag of an optimum selection time position for service, said time position of said optimum selection time position flag having a value less than that of said time priority flag of the last required time for service, and, if said earliest authorized selection time position flag and said optimum selection time position flag are present simultaneously, said optimum selection time position flag has a value which is greater than that of said earliest authorized selection flag before which said object cannot be serviced.

11. The system claimed in claim 1 wherein a plurality of time priority flags of different types are stored in the memory elements of each of said subsets and said system includes a number of flag element matrices equal to the number of different types of said time priority flags.

12. The system claimed in claim 1 wherein a plurality of time priority flags of different types are stored in the memory elements of each of said subsets, each memory element includes a number of memory points at least equal to the number of different types of said time priority flags and each memory point is allocated to a time priority flag of a particular type.

13. The system claimed in claim 10 further comprising flag search means which, during a first phase, search each subset for a first time priority flag which, of all said time priority flags of said subset, has the time position of the highest value, and after preselecting said subsets which have said first time priority flag of the lowest value, during a second phase, the subsequent flags of lower time position in the preselected subsets are searched for and the subsets are selected which have a subsequent flag at the lowest time position.

14. The system claimed in claim 13 wherein:

each memory element stores a single priority flag, a last time flag, an earliest authorized selection flag and an optimum time flag are allocated to each subset, said flags corresponding in each subset to different time positions, said object priority selector means include additional means for generating a time priority flag search signal for each of said subsets having said earliest authorized selection flag which has reached said object priority selector means on going beyond the lowest time position to reach the time position of a server, and said first time position selector means include additional means for effecting two successive phases of selection of other priority flags, first by preselecting the object having the time position of the latest time flag which has the lowest value, and then by selecting, from the preselected subsets, the object whose time position of the optimum time flag has the lowest value.

15. The system claimed in claim 14 wherein the object priority selector means further include, for each subset, a memory in which are stored:

an authorized selection indication as soon as the time position of the authorized selection priority flag has reached a time position of the server, and an optimum position reached indication as soon as the time position of the optimum position priority flag has reached the time position of the server.

16. The system claimed in claim 14 wherein said object priority selector means are connected to the memory elements of each subset of said matrix of elements by:

an outgoing conductor connected to said memory element of said subset that corresponds to said time position having the highest value, enabling it to generate, for the corresponding subset, a flag search activation signal for initiating an operation searching for a first flag to be selected as a matter of priority in said subset, and an incoming conductor from said memory element of said subset that corresponds to said time position having the lowest value, enabling it to receive a selected object signal and to effect the final choice of at least one object to be serviced from the subsets from which it receives a selected object signal.

17. The system claimed in claim 6 wherein each of said memory elements is connected:

to the memory element of the same subset corresponding to the next higher time position, via a flag search input for receiving a flag search signal, said memory element of said subset having the time position with the highest value receiving a flag search signal supplied by said object priority selector means, and to the memory element of the same subset corresponding to the next lower time position, via a flag search output for transmitting a flag search signal, the memory element having the lowest time position value supplying said flag search signal to said object priority selector means, which signal, if it is active, signifies a selected object signal for those means, and wherein each memory element:

activates the corresponding incoming common conductor of said time selector means to transmit thereto a time position signal which is a candidate for selection if, simultaneously, an active flag search signal is received and said time priority flag is stored in said memory element, activates an unselected local priority flag signal if, simultaneously:
- an active flag search signal is received,
- a time priority flag is stored in the memory element, and
- no retained time position signal is received from said outgoing common conductor of said time selection means, and retransmits to said element of the same subset which has the next lower time position a flag search signal which is active if, simultaneously:
- an active flag search signal is received, and
- either no time priority flag is stored in said memory element,
- or the time priority flag is stored in said memory element and said unselected local priority flag signal is not active, an effect of the unselected local priority flag signal then being to block the propagation of said flag search signal to the other elements of the subset of lower rank if the memory element has transmitted a time position signal which is a candidate for selection to said time selector means but said means have not returned a retained time position signal.

18. Application of a system as claimed in claim 1 to managing cells or packets of digital signals in a telecommunication system buffer which cells or packets enter and leave at a high frequency.

* * * * *